United States Patent [19]

Mano

[11] Patent Number: 5,867,705
[45] Date of Patent: Feb. 2, 1999

[54] DEVICE CONTROL APPARATUS AND METHOD OF CONTROLLING PARALLEL EXECUTION OF DEVICE-CONTROL INSTRUCTIONS TO DEVICES OF A SYSTEM

[75] Inventor: Kosei Mano, Kawasaki, Japan

[73] Assignee: Fujitsu Limited, Kanagawa, Japan

[21] Appl. No.: 723,023

[22] Filed: Sep. 30, 1996

[30] Foreign Application Priority Data

May 29, 1996 [JP] Japan .................................. 8-135453
[51] Int. Cl.⁶ ....................................................... G06F 9/00
[52] U.S. Cl. .......................................... 395/675; 395/732
[58] Field of Search ..................................... 395/675, 670, 395/672, 673, 726, 728, 729, 732, 737, 868, 200.38, 200.39

[56] References Cited

U.S. PATENT DOCUMENTS

| 5,491,786 | 2/1996 | Egan et al. | 395/675 |
| 5,594,901 | 1/1997 | Andoh | 395/675 |
| 5,694,602 | 12/1997 | Smith | 395/675 |

FOREIGN PATENT DOCUMENTS 63-219294  9/1988  Japan .

OTHER PUBLICATIONS

Shivaratri et al., Two Adaptive Location Policies for Global Scheduling Algorithm, IEEE/IEE Online Publications, pp. 502–509, Dec. 1990.

Shivaratri et al., Load Distributing for Locally Distributed Systems, IEEE/IEE Online Publications pp. 33–44, Dec. 1992.

Primary Examiner—Parshotam S. Lall
Assistant Examiner—Patrice L. Winder
Attorney, Agent, or Firm—Helfgott & Karas, P.C.

[57] ABSTRACT

A device control apparatus includes a request accepting unit which accepts a device control request, the device control request containing an instruction code indicating a specified instruction and a device identifier indicating a specified device. A competition control unit includes a set of competition definition tables for respective devices and respective device-control instructions, reads out one of the competition definition tables by the device control request, and recognizes competition states between in-process instructions to competition devices and the specified instruction to the specified device by using the read-out competition definition table. A parallel execution control unit performs execution of one or a plurality of the specified instruction and the in-process instructions in accordance with the competition states when a sum of a first weight for the specified instruction and a second weight for the in-process instructions is less than a maximum weight.

15 Claims, 21 Drawing Sheets

FIG. 4

| DEVICE NAME | OPERATION MODE |
|---|---|
| CC | ACT/SBY |
| MM | MASTER/SLAVE |
| CHC | ACT/ACT |
| NWC | MASTER/SLAVE |
| NW | MASTER/SLAVE |
| DK | MASTER/SLAVE |
| WS | ACT/ACT |
| MO | ACT/ACT |

FIG. 5

| DEVICE NAME | LOGICAL DEVICE IDENTIFIER (LDI) | |
|---|---|---|
| | NUMBER-A | NUMBER-B |
| CC#0 | 0 | 0 |
| CC#1 | 0 | 1 |
| MM#0 | 1 | 0 |
| MM#1 | 1 | 1 |
| CHC#0 | 2 | 0 |
| CHC#1 | 2 | 1 |
| NWC#0 | 3 | 0 |
| NWC#1 | 3 | 1 |
| NW#0 | 4 | 0 |
| NW#1 | 4 | 1 |
| DK#0 | 5 | 0 |
| DK#1 | 5 | 1 |
| DK#2 | 5 | 2 |
| DK#3 | 5 | 3 |
| WS#0 | 6 | 0 |
| WS#1 | 6 | 1 |
| MO#0 | 7 | 0 |
| MO#1 | 7 | 1 |

LOGICAL DEVICE IDENITIFIER (8 BITS)

| NUMBER-A | NUMBER-B |
|---|---|
| 4 BITS | 4 BITS |

FIG. 7

| DEVICE-CONTROL INSTRUCTION | DEVICE-CONTROL INSTRUCTION CODE (DIC) | COMPETITION PRIORITY LEVEL (CPL) |
|---|---|---|
| ISOLATING BY FAILURE | 0 | 3 |
| SWITCHING BY FAILURE | 1 | 3 |
| AUTOMATIC PLACING IN SERVICE | 2 | 1 |
| AUTOMATIC DIAGNOSIS | 3 | 1 |
| PERIODIC SWITCHING | 4 | 1 |
| PERIODIC TESTING | 5 | 1 |
| PLACING IN SERVICE BY COMMAND | 6 | 2 |
| ISOLATING BY COMMAND | 7 | 2 |
| SWITCHING BY COMMAND | 8 | 2 |
| TESTING/DIAGNOSIS BY COMMAND | 9 | 2 |
| ADDING DEVICE TO SYSTEM | 10 | 1 |
| DELETING DEVICE FROM SYSTEM | 11 | 1 |

R = 0 : NO COMPETITION
R = 1 : COMPETITION PRIORITY LEVEL 1
R = 2 : COMPETITION PRIORITY LEVEL 2
R = 3 : COMPETITION PRIORITY LEVEL 3

R = 0 : NO COMPETITION
R = 1 : COMPETITION PRIORITY LEVEL 1
R = 2 : COMPETITION PRIORITY LEVEL 2
R = 3 : COMPETITION PRIORITY LEVEL 3

K : IN-PROCESS DEVICE-CONTROL INSTRUCTION CODE
R : COMPETITION PRIORITY LEVEL

FIG. 11

| DEVICE NAME | OPERATING STATE |
|---|---|
| CC#0 | ACT |
| CC#1 | SBY |
| MM#0 | MASTER |
| MM#1 | SLAVE |
| CHC#0 | ACT |
| CHC#1 | ACT |
| NWC#0 | MASTER |
| NWC#1 | SLAVE |
| NW#0 | MASTER |
| NW#1 | SLAVE |
| DK#0 | MASTER |
| DK#1 | OUS |
| DK#2 | MASTER |
| DK#3 | OUS |
| WS#0 | ACT |
| WS#1 | OUS |
| MO#0 | ACT |
| MO#1 | OUS |

OUS : IN SEPARATED STATE

FIG. 13A

| 31 → | | |
|---|---|---|
| | all 0 | 0 |
| | all 0 | 1 |
| | all 0 | 2 |
| | all 0 | 3 |
| | all 0 | 4 |
| | all 0 | 5 |
| | 000000000000010 | 6 |
| | all 0 | 7 |

FIG. 13B

| 31 → | | |
|---|---|---|
| | all 0 | 0 |
| | all 0 | 1 |
| | all 0 | 2 |
| | all 0 | 3 |
| | all 0 | 4 |
| | all 0 | 5 |
| | all 0 | 6 |
| | 000000000000010 | 7 |

A : PROGRAM NUMBER WHEN P/E WEIGHT EXCEEDS MAX WEIGHT
B : PROGRAM NUMBER FOR COMPETITION PRIORITY LEVEL 1 (R=1)
C : PROGRAM NUMBER FOR COMPETITION PRIORITY LEVEL 2 (R=2)
D : PROGRAM NUMBER FOR COMPETITION PRIORITY LEVEL 3 (R=3)

FIG.17

| DEVICE NAME | OPERATING STATE |
|---|---|
| CC#0 | ACT |
| CC#1 | SBY |
| MM#0 | MASTER |
| MM#1 | SLAVE |
| CHC#0 | ACT |
| CHC#1 | ACT |
| NWC#0 | MASTER |
| NWC#1 | SLAVE |
| NW#0 | MASTER |
| NW#1 | SLAVE |
| DK#0 | MASTER |
| DK#1 | OUS→SLAVE |
| DK#2 | MASTER |
| DK#3 | SLAVE |
| WS#0 | ACT |
| WS#1 | ACT |
| MO#0 | ACT |
| MO#1 | ACT |

FIG. 20A
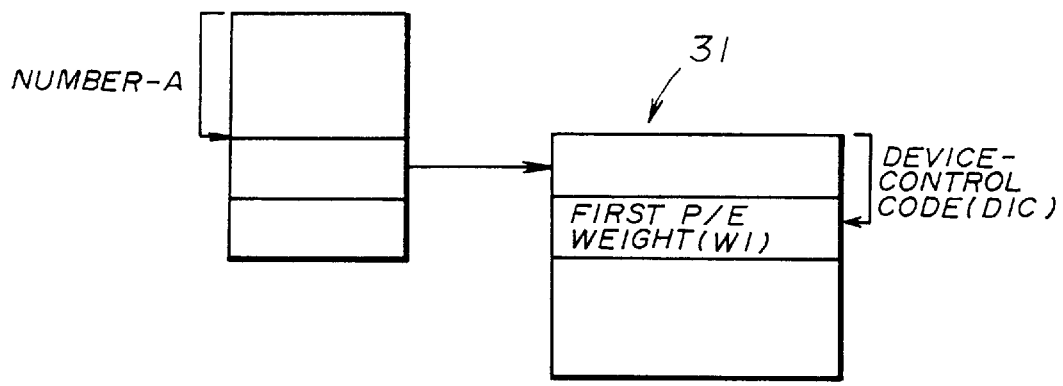
FIG. 20B
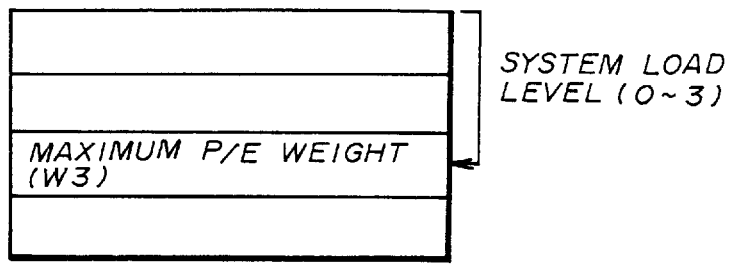
FIG. 20C
SECOND P/E WEIGHT (W2)

FIG. 21

SECOND P/E WEIGHT (W2)

| 0 |
|---|

SET OF MAXIMUM P/E WEIGHTS (W3)

| 12 |
|---|
| 8 |
| 4 |
| 1 |

SYSTEM LOAD LEVEL = 2

FIRST P/E WEIGHT (W1) FOR WS#1

| 1 |
|---|

FIRST P/E WEIGHT (W1) FOR MO#1

| 1 |
|---|

FIRST P/E WEIGHT (W1) FOR DK#1

| 2 |
|---|

SECOND P/E WEIGHT (W2) AT THIS TIME IS SET AT 4

FIRST P/E WEIGHT (W1) FOR DK#3

| 2 |
|---|

SUM OF W2 AND W1 AT THIS TIME EXCEEDS W3

DEVICE CONTROL APPARATUS AND METHOD OF CONTROLLING PARALLEL EXECUTION OF DEVICE-CONTROL INSTRUCTIONS TO DEVICES OF A SYSTEM

BACKGROUND OF THE INVENTION (1) Field of the Invention

The present invention relates to a device control apparatus and method of controlling parallel execution of device-control instructions to a plurality of devices of a system.

An information system such as a digital switching system is constructed with a plurality of devices to provide various functions. Recently, it is required that the information system be enabled to efficiently execute a device-control instruction such as placing in service, isolating or switching to any of the devices of the information system. It is desirable to easily carry out an instruction execution control of the devices of the information system.

(2) Description of the Related Art

A conventional digital switching system is one of information systems, and, generally, it is constructed with a plurality of main control devices (such as central processing units), a plurality of main storage devices, a plurality of switching network control devices, a plurality of switching networks, a plurality of channels, and a plurality of external devices (such as magnetic disk units). Various functions of the system are provided by the above-mentioned devices.

In the conventional digital switching system, a device-control instruction such as placing in service, isolating or switching to a single device is executed in accordance with a program of a corresponding central processing unit which controls the device. Since the central processing unit controls a plurality of devices connected thereto, it executes one of device-control instructions to respective devices at a time.

When a competition state between two or more devices with respect to device-control instructions by the central processing unit has occurred, a detection of the competition state is performed by individual programs for the two or more devices in a parallel manner.

As described above, in the conventional digital switching system, one of device-control instructions to two or more devices is executed at a time. There is a problem in that it takes a long time to execute placing the two or more devices in service. In addition, since the individual programs for the two or more devices perform in parallel detections of the competition states of the devices, it is necessary that the programs include a complicated routine in order to perform such detections. Further, it is difficult for the conventional digital switching system to provide a flexibility when adding a new device to the system is required.

SUMMARY OF THE INVENTION

An object of the present invention is to provide an improved instruction execution control of a plurality of devices of a system in which the above-described problems are eliminated.

Another object of the present invention is to provide a device control apparatus and method which provides a high-speed execution of device-control instructions to devices of a system by performing parallel execution of the device-control instructions in accordance with detected competition states.

Still another object of the present invention is to provide a device control apparatus and method which provides a simple control of parallel execution of device-control instructions to devices of a system by detecting competition states in a systematic manner.

The above-mentioned objects of the present invention are achieved by a device control apparatus for controlling execution of one or a plurality of device-control instructions to a plurality of devices of a system, which comprises: a request accepting unit accepting a device control request, the device control request containing an instruction code indicating a specified instruction and a device identifier indicating a specified device; a competition control unit including a set of competition definition tables for the respective devices and the respective device-control instructions, reading out one of the competition definition tables by the device control request, and recognizing competition states between in-process instructions to competition devices and the specified instruction to the specified device by using the readout competition definition table; and a parallel-execution control unit performing execution of one or a plurality of the specified instruction and the in-process instructions in accordance with the competition states when a sum of a first weight for the specified instruction and a second weight for the in-process instructions is less than a maximum weight.

The above-mentioned objects of the present invention are achieved by a device control method of controlling execution of one or a plurality of device-control instructions to a plurality of devices of a system, wherein a competition control unit includes a set of competition definition tables for the respective devices and the respective device-control instructions, which comprises the steps of: accepting a device control request, the device control request containing an instruction code indicating a specified instruction and a device identifier indicating a specified device; reading out one of the competition definition tables by the device control request, and recognizing competition states between in-process instructions to competition devices and the specified instruction to the specified device by using the read-out competition definition table; and performing execution of one or a plurality of the specified instruction and the in-process instructions in accordance with the competition states when a sum of a first weight for the specified instruction and a second weight for the in-process instructions is less than a maximum weight.

According to the present invention, it is possible to provide a simple control of parallel execution of device-control instructions to a plurality of devices of a system by using the set of competition definition tables provided in the competition control unit. It is possible for the present invention to provide a high-speed execution of device-control instructions to devices of a system by using the parallel-execution control unit.

BRIEF DESCRIPTION OF THE DRAWINGS

The above and other objects, features and advantages of the present invention will become more apparent from the following detailed description when read in conjunction with the accompanying drawings in which:

FIG. 4 is a diagram showing a set of operation modes for devices of the digital switching system in FIG. 3;

FIG. 5 is a diagram showing a set of logical device identifiers for respective devices of the digital switching system in FIG. 3;

FIG. 7 is a diagram showing a set of device-control instruction codes used when the operation in FIG. 6 is performed;

FIG. 11 is a diagram showing an example of operating states of all the devices of the digital switching system in FIG. 3;

FIGS. 13A and 13B are diagrams showing the contents of competition definition tables for two other devices when the instruction is made to each of those devices;

FIG. 17 is a diagram showing an example of operating states of all the devices of the digital switching system;

FIG. 20A, 20B, and 20C are a diagram for explaining a way of determining a parallel-execution weight; and FIG. 21 is a diagram showing an example of the operation of the parallel-execution control unit in FIG. 1.

DETAILED DESCRIPTION OF THE PREFERRED EMBODIMENT

A description will now be given of the preferred embodiment of the present invention with reference to the accompanying drawings.

Figure 1:
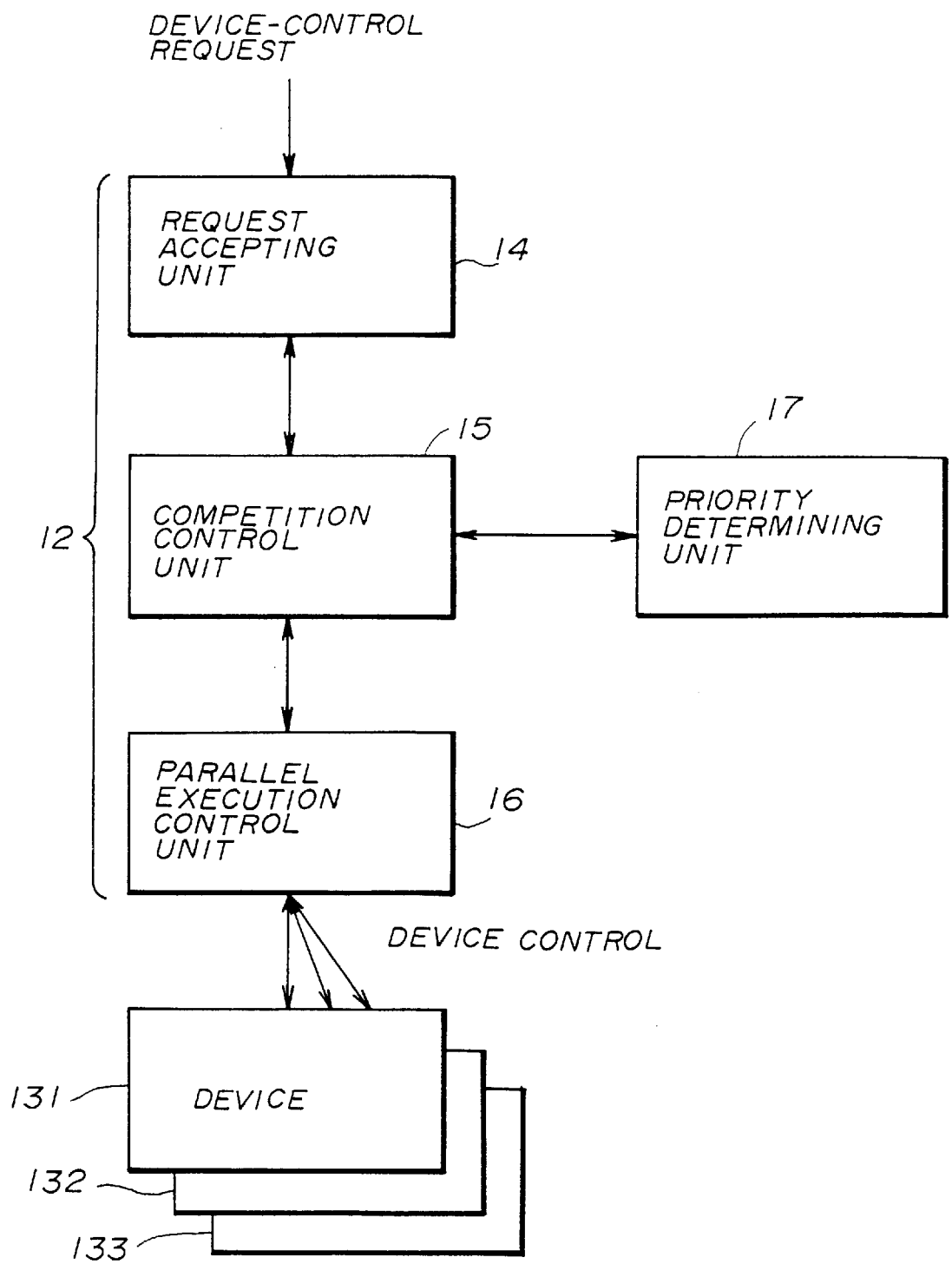
FIG. 1 is a block diagram of a device control apparatus according to a basic concept of the present invention.

FIG. 1 shows a device control apparatus 12 according to a basic concept of the present invention. The device control apparatus 12 comprises a request accepting unit 14, a competition control unit 15, a parallel execution control unit 16, and a priority determining unit 17.

The device control apparatus 12 carries out a parallel execution control of a plurality of devices 131, 132, . . . of a system. As shown in FIG. 1, the device control apparatus 12 and the plurality of devices 131, 132, . . . are incorporated in the system. The device control apparatus 12 is capable of performing a device-control instruction such as placing in service, isolating or switching to any of the devices of the system.

The request accepting unit 14 accepts a device control request (DCR). The device control request (DCR) contains an instruction code indicating a specified instruction and a device identifier indicating a specified device.

The competition control unit 15, the parallel execution control unit 16, and the priority determining unit 17 carry out the parallel execution of device-control instructions to the devices of the system as follows.

The competition control unit 15 includes a set of competition definition tables for the respective devices and the respective device-control instructions. When the DCR from the request accepting unit 14 is received, the competition control unit 15 reads out one of the competition definition tables by the DCR, and recognizes competition states between in-process instructions to competition devices and the specified instruction to the specified device by using the read-out competition definition table.

When no competition state is recognized, an operation of the parallel execution control unit 16 is started by the competition control unit 15. When the competition states are recognized, an operation of the priority determining unit 17 is started by the competition control unit 15.

The parallel execution control unit 16 performs execution of one or a plurality of the specified instruction and the in-process instructions in accordance with the competition states when a sum of a first weight for the specified instruction and a second weight for the in-process instructions is less than a maximum weight.

The priority determining unit 17 detects whether the in-process instructions are preferential to the specified instruction by comparing a priority level of the read-out competition definition table with priority levels of a competition state table. Individual priority levels defined in the set of competition definition tables are capable of being modified.

The priority determining unit 17 determines a program number by the priority level of the read-out competition definition table when it is detected that the specified instruction is preferential, and starts a post-processing program read out by the program number.

The parallel execution control unit 16 determines the first weight by the device identifier and the instruction code in the device control request, determines the second weight for the in-process instructions, and determines the maximum weight by a system load level.

Individual weights for the respective device control instructions are defined in the set of competition definition tables, and the individual weights and the maximum weight are capable of being modified.

The parallel execution control unit 16 starts a post-processing program when the sum of the first weight and the second weight is greater than or equal to the maximum weight, the post-processing program being read out by a priority level for the specified instruction.

Figure 2:
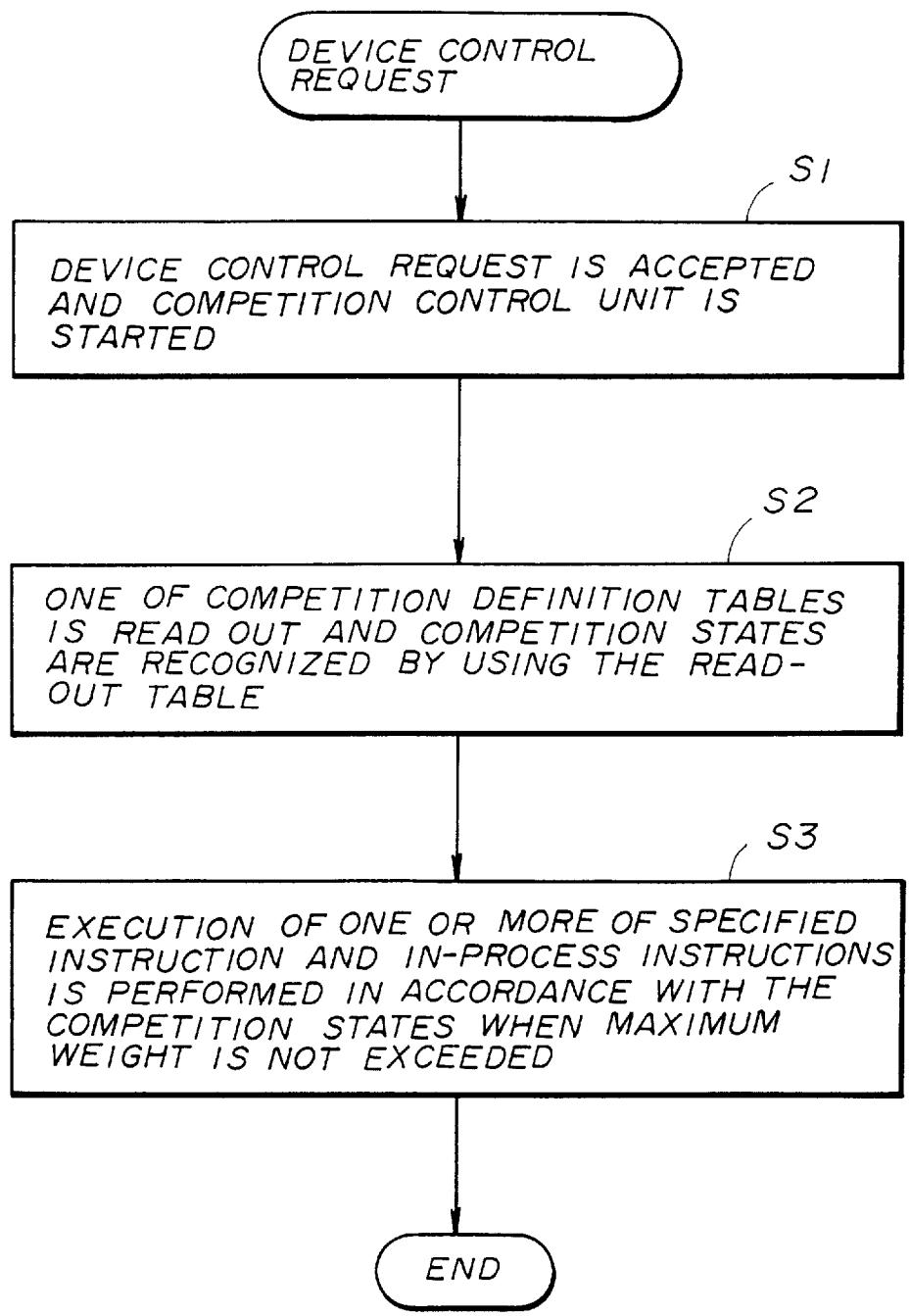
FIG. 2 is a flowchart for explaining an operation of the device control apparatus in FIG. 1.

FIG. 2 shows an operation of the device control apparatus 12 in FIG. 1.

Referring to FIG. 2, the request accepting unit 14, at step S1, accepts a device control request (DCR), and starts the operation of the competition control unit 15. As described above, the device control request (DCR) contains an instruction code indicating a specified instruction and a device identifier indicating a specified device. The competition control unit 15 includes a set of competition definition tables for the respective devices and the respective device-control instructions.

The competition control unit 15, at step S2, reads out one of the competition definition tables by the device control request (DCR), and recognizes competition states between in-process instructions to competition devices and the specified instruction to the specified device by using the readout competition definition table. When no competition state is recognized, the operation of the parallel execution control unit 16 is started. When the competition states are recognized, the operation of the priority determining unit 17 is started.

The parallel execution control unit 17, at step S3, performs execution of one or a plurality of the specified instruction and the in-process instructions in accordance with the competition states when a sum of a first weight for the specified instruction and a second weight for the in-process instructions does not exceed a maximum weight.

The operation of the device control apparatus and method of the present invention will be described in more detail below.

Figure 3:
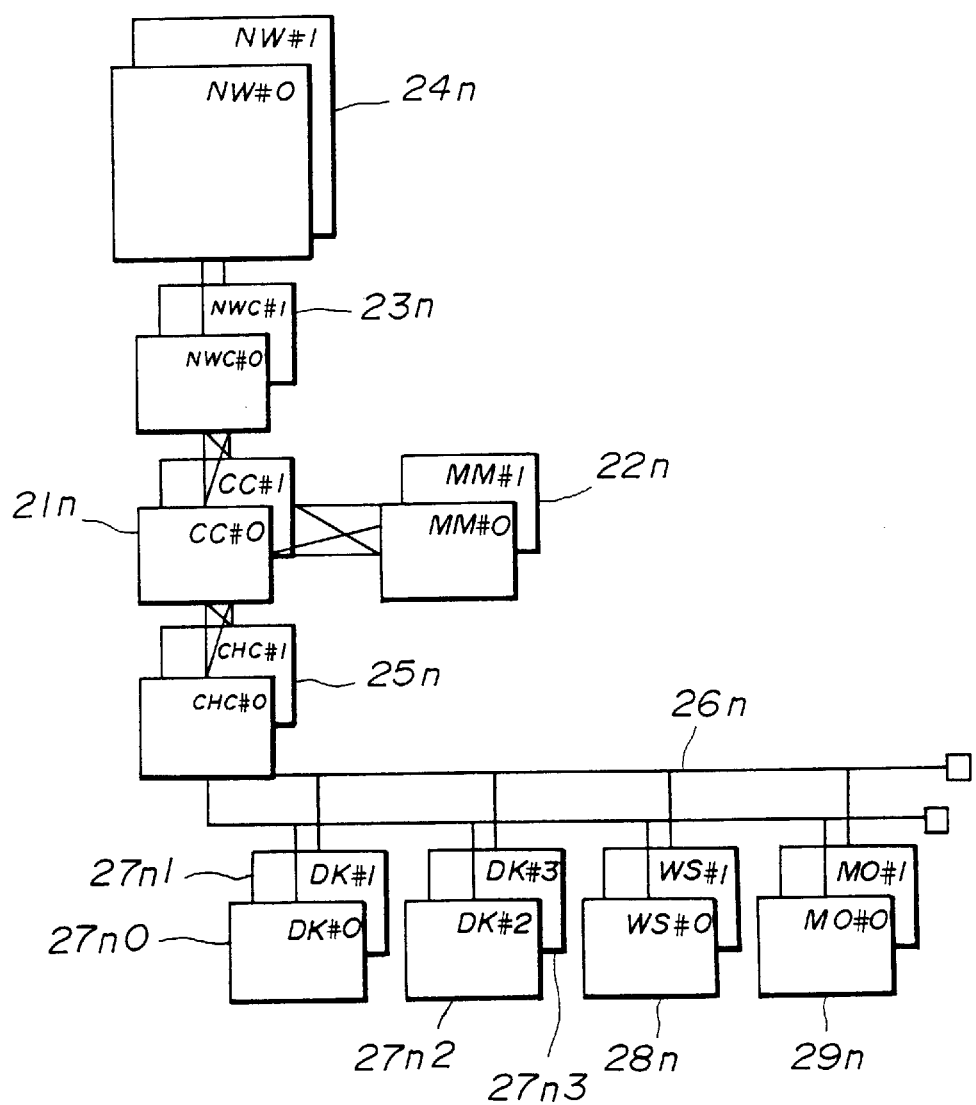
FIG. 3 is a system block diagram of a digital switching system to which the present invention is applied.

FIG. 3 shows a digital switching system to which the present invention is applied. Referring to FIG. 3, the digital switching system includes a plurality of central processing units 21n (CC) where n is an integer that indicates a system identification number. In FIG. 3, the central processing units 21n with even system identification numbers are indicated by a single block "CC#0" and the central processing units 21n with odd system identification numbers are indicated by a single block "CC#1". Other elements of the digital switching system with even system identification numbers and odd system identification numbers are also designated in the same manner.

A plurality of main storage units 22n (MM) are commonly connected to the central processing unit 21n (CC#0) and the central processing unit 21n (CC#1). The main storage units 22n are indicated as a single block "MM#0" and a single block "MM#1" in FIG. 3, similarly to the central processing units 21n mentioned above.

A plurality of switching network control units 23n (NWC) are commonly connected to the central processing unit 21n (CC#0) and the central processing unit 21n (CC#1). The switching network control units 23n are indicated as a single block "NWC#0" and a single block "NWC#1" in FIG. 3. Further, a plurality of switching networks 24n (NW) which are, for example, digital branch exchanges are connected to the switching network control units 23n respectively. Each of the switching networks 24n is connected to a number of transmission lines, and controlled by a corresponding switching network control unit 23n.

A plurality of channels 25n (CHC) are commonly connected to the central processing unit 21n (CC#0) and the central processing unit 21n (CC#1). The channels 25n are indicated as a single block "CHC#0" and a single block "CHC#1" in FIG. 3. Further, a plurality of buses 26n are respectively connected to the plurality of channels 25n. Various external devices and a corresponding channel 25n are interconnected by one of the buses 26n. More specifically, the channel 25n "CHC#0" is connected to each of a magnetic disk unit 27n0 "IDK#0", a magnetic disk unit 27n2 "DK#2", a workstation 28n "WS#0" and a magneto-optic disk unit 29n "Mo#0", and the channel 25n "CHC#1" is connected to each of a magnetic disk unit 27n1 "DK#1", a magnetic disk unit 27n3 "DK#3", a workstation 28n "WS#1" and a magneto-optic disk unit 29n "MO#1".

The plurality of devices 131, 132, in FIG. 1 correspond to all the elements of the above digital switching system which are indicated by rectangular blocks in FIG. 3. The device control apparatus 12 in FIG. 1 is provided in, for example, the main storage unit 22n (MM#0) of the digital switching system in FIG. 3.

The above digital switching system has a redundant structure in which a duplicate switching network (NW#0, NW#1), a duplicate central processing unit (CC#0, CC#1), a duplicate main storage unit (MM#0, MM#1), a duplicate switching network control unit (NWC#0, NWC#1), a duplicate channel (CHC#0, CHC#1) and a duplicate external device (DK#0, DK#1; DK#2, DK#3; WS#0, WS#1; MO#0, MO#1) are provided in order to ensure a high reliability. However, the device control apparatus of the present invention is also applicable to a system having no redundant structure.

Next, a description will be given of a device control apparatus in a preferred embodiment of the present invention. A parallel execution control of the devices of the digital switching system in FIG. 3 is carried out by the device control apparatus of the present embodiment.

FIG. 4 shows a set of operation modes for respective devices of the digital switching system in FIG. 3. As shown in FIG. 4, the set of operation modes is assigned for all the devices of the digital switching system including the central processing units 21n (CC), the main storage units 22n (MM), the switching network control units 23n (NWC), the switching networks 24n (NW), the channels 25n (CHC), the magnetic disk units 27n (DK), the workstations 28n (WS) and the magneto-optic disk units 29n (MO).

An operation mode "ACT/SBY", which is assigned for the central processing units 21n (CC), as shown in FIG. 4, means that a device (or one central processing unit 21n) in an active (ACT) operating state provides its function, and another device (or another central processing unit 21n) in a stand-by (SBY) state stops operating and does not provide its function. In order to set the device in the stand-by (SBY) state to be in the active (ACT) operating condition, it is necessary to perform a certain initial setting of that device to restart the operation.

An operation mode "MASTER/SLAVE", which is assigned for the main storage units 22n (MM), the switching network control units 23n (NWC), the switching networks 24n (NW), and the magnetic disk units 27n (DK), means that a master device (one of the main storage units 22n) is in a MASTER operating state, a slave device (another main storage unit 22n) is in a SLAVE operating state, and these devices together operate and provide their functions. In the operation mode MASTER/SLAVE, the digital switching system outputs data to the master device and inputs data from the master device, and the digital switching system outputs data to the slave device. In other words, in the operation mode MASTER/SLAVE, the master device performs both supplying data to the digital switching system and receiving data from the system, but the slave device performs only receiving data from the digital switching system.

An operation mode "ACT/ACT", which is assigned for the channels 25n (CHC), the workstations 28n (WS) and the magneto-optic disk units 29n (MO), means that system loads are uniformly distributed to the devices with even system identification numbers (CHC#0, WS#0, MO#0) and the devices with odd system identification numbers (CHC#1, WS#1, MO#1). This operation mode ACT/ACT is inclusive of a case in which the digital switching system has no redundant structure of the devices.

FIG. 5 shows a set of logical device identifiers (LDI) for respective devices of the digital switching system in FIG. 3.

All the devices of the digital switching system (which are indicated by rectangular blocks in FIG. 3) are respectively identified by the logical device identifiers (LDI) as shown in FIG. 5. In FIG. 5, the logical device identifiers (LDI) are indicated by decimal numbers.

As indicated at the bottom of FIG. 5, each logical device identifier (LDI) contains a number-A and a number-B. Each LDI consists of 8 bits which represent a memory location of each of a competition definition table and a competition state table (which will be described later). The number-A consists of 4 bits which are the four most significant bits of the LDI. The number-B consists of 4 bits which are the four least significant bits of the LDI.

Figure 6:
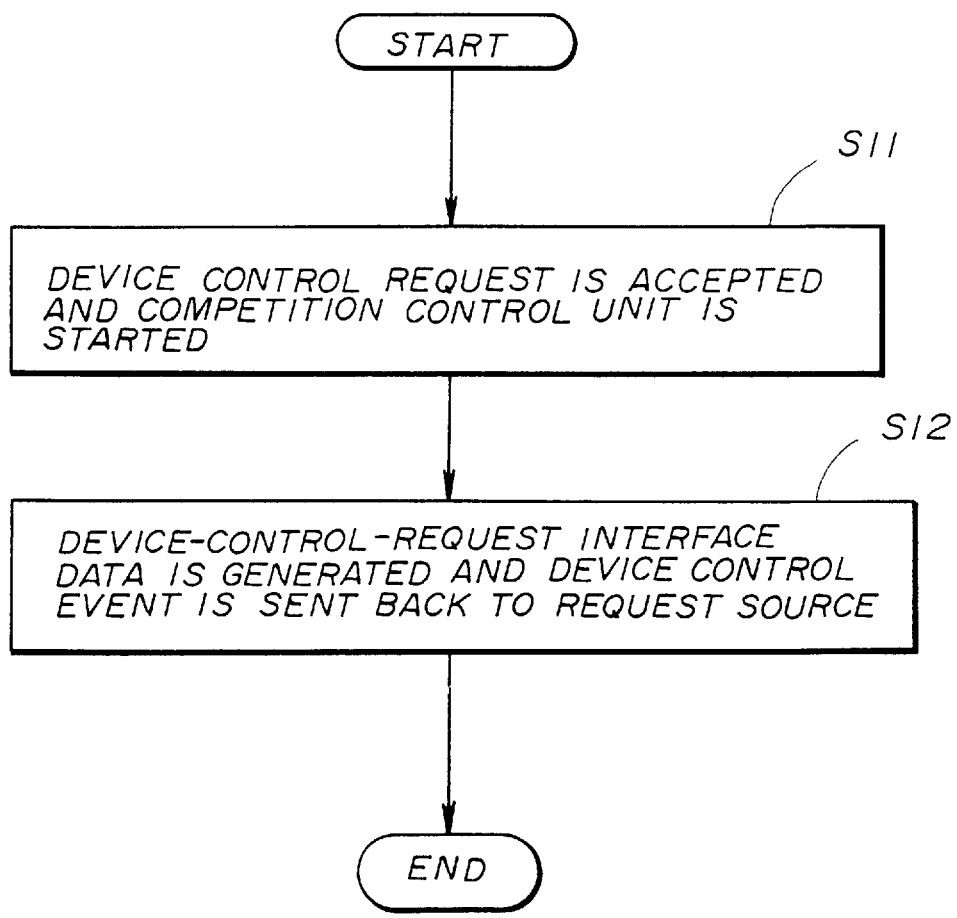
FIG. 6 is a flowchart for explaining an operation of a request accepting unit in FIG. 1.

FIG. 6 shows an operation of the request accepting unit 14 in FIG. 1. The request accepting unit 14 receives a device control request (DCR) as an input, and generates device-control-request interface data (DCRI) containing a device control event (DCE) as an output.

Referring to FIG. 6, the request accepting unit 14, at step S11, accepts a device control request (DCR), supplied from a request source (not shown), as the input. Further, step S11 starts the competition control unit 15 in response to the DCR. The device control request DCR is an instruction issued by the request source to a specified device of the digital switching system. The DCR at this step contains a specified logical device identifier (one of the logical device identifiers in FIG. 5) and a specified device-control instruction code (one of device-control instruction codes in FIG. 7).

The request accepting unit 14, at step S12, generates the device-control-request interface data (DCRI) containing a device control event (DCE). Further, step S12 transmits the device control event (DCE) included in the DCRI to the request source.

The device control event (DCE) at this step indicates a cause of failure (or an error code) output by the competition control unit 15 when starting the competition control unit 15 has failed, or data (or a normal code) output by the competition control unit 15 when the starting of the competition control unit 15 is normally performed. Such data is transmitted by the request accepting unit 14 to the request source.

FIG. 7 shows a set of device-control instruction codes used when the operation of the request accepting unit 14 is performed.

A device-control instruction, which is made by the request source to control a specified device of the digital switching system, is indicated by a specified device-control instruction code in the device control request (DCR). In the present embodiment, as shown in FIG. 7, there are various device-control instructions which can be made to control a device of the digital switching system, and a set of device-control instruction codes (DIC) for respective device-control instructions is defined.

More specifically, in the present embodiment, the device-control instructions, as shown in FIG. 7, include: "ISOLATING BY FAILURE", "SWITCHING BY FAILURE", "AUTOMATIC PLACING IN SERVICE", "AUTOMATIC DIAGNOSIS", "PERIODIC SWITCHING", "PERIODIC TESTING", "PLACING IN SERVICE BY COMMAND", "ISOLATING BY COMMAND", "SWITCHINGG BY COMMAND", "TESTING/DIAGNOSIS BY COMMAND", "ADDING DEVICE TO SYSTEM", and "DELETING DEVICE FROM SYSTEM". These device-control instructions are respectively indicated by the device-control instruction codes (DIC) in FIG. 7.

Further, FIG. 7 shows a set of competition priority levels (CPL) for the respective device-control instruction codes (DIC). This will be described later.

Figure 8:
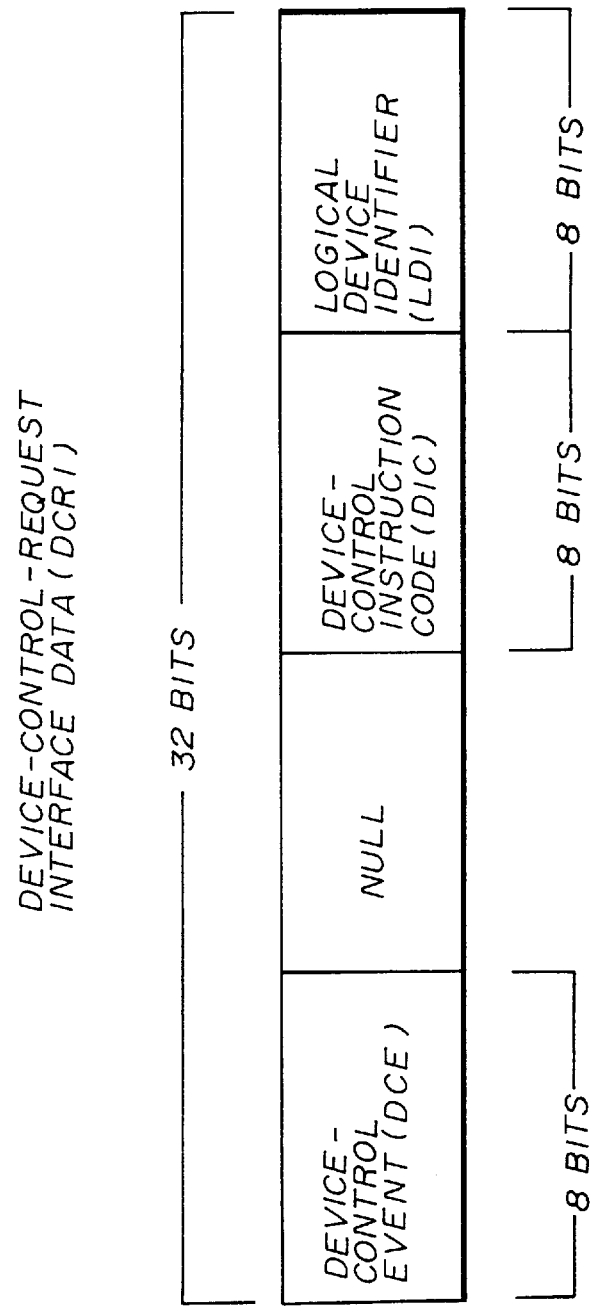
FIG. 8 is a diagram showing a structure of device control request interface data.

FIG. 8 shows a structure of the device-control-request interface data (DCRI) which is generated by the request accepting unit 14 from the device control request (DCR).

As shown in FIG. 8, the DCRI contains the device-control event (DCE), a null character, the device-control instruction code (DIC), and the logical device identifier (LDI). In the present embodiment, the DCRI consists of a total of 32 bits in which each of the DCE, the null character, the DIC, and the LDI consists of 8 bits.

Figure 9:
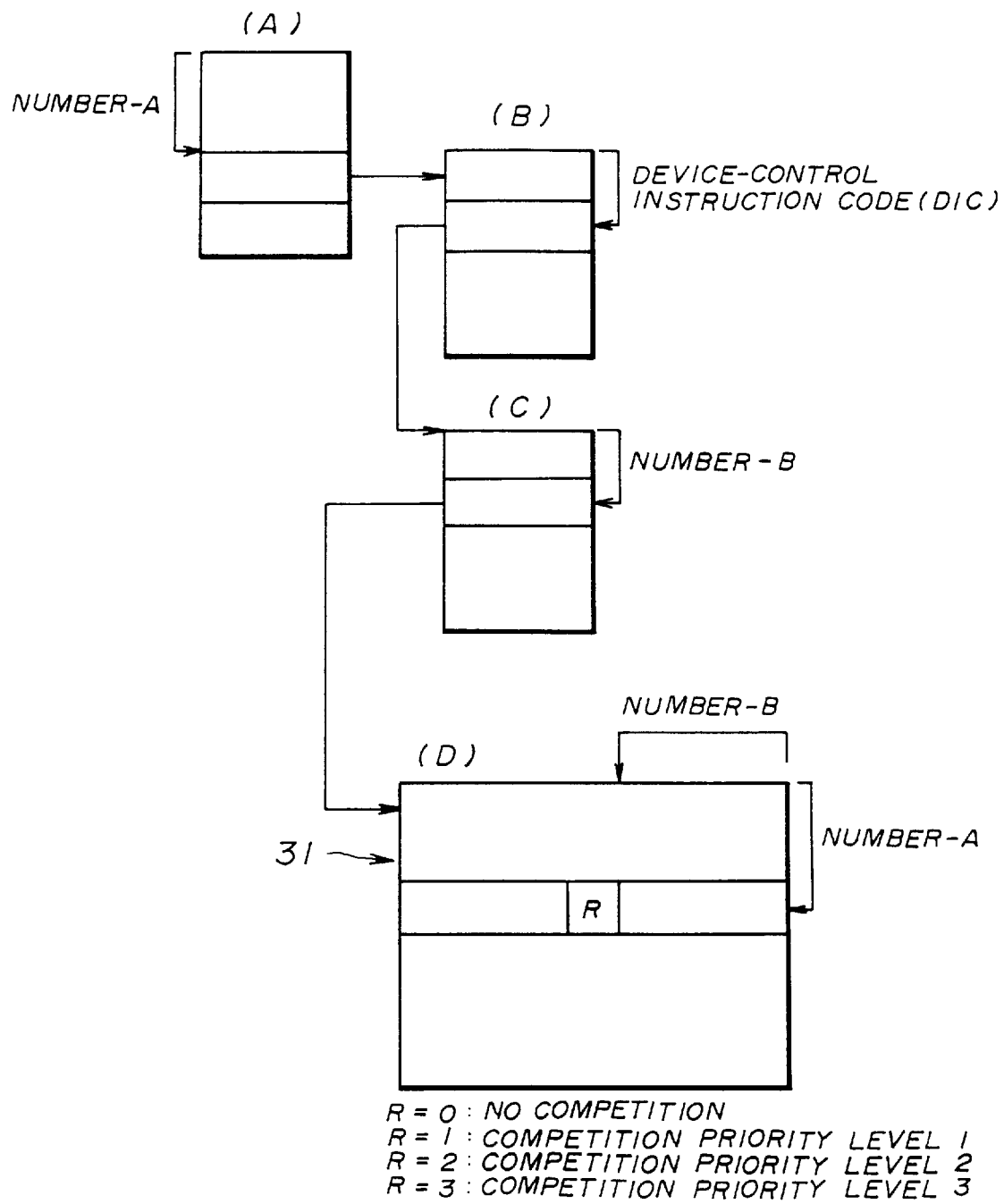
FIG. 9 is a diagram for explaining a way of reading out one of competition definition tables by a competition control unit in FIG. 1.

FIG. 9 shows a way of reading out one of competition definition tables 31 by the device control request (DCR).

The competition control unit 15 detects a competition priority level defined for the specified device in the device control request (DCR), by using a read-out competition definition table 31. Further, it is determined whether there is a competition state between devices including the specified device, by comparing the read-out competition definition table 31 with a competition state table 32 (which will be described later).

In the present embodiment, a set of competition definition tables 31 for respective combinations of the logical device identifier (LDI) of each device (as shown in FIG. 5) and the device-control instruction code (DIC) of each device-control instruction (as shown in FIG. 7) are stored in the competition control unit 15. One of the competition definition tables 31 is read out by the competition control unit 15 in accordance with the device control request (DCR) as shown in FIG. 9.

As indicated by (A) in FIG. 9, a group of device-control instructions for a group of devices whose kind is the same as a kind of the specified device is read out by the number-A of the logical device identifier (LDI) in the device control request (DCR). As described above, when the device control request (DCR) is issued, the specified device-control instruction is made to control the specified device of the digital switching system.

As indicated by (B) in FIG. 9, the group of devices for the specified device-control instruction is read out by the device-control instruction code (DIC) in the DCR. The specified device-control instruction among the group of device-control instructions is defined by the DIC in the DCR as shown in FIG. 7.

As indicated by (C) in FIG. 9, the specified device among the group of devices is read out by the number-B of the logical device identifier (LDI) in the DCR.

As indicated by (D) in FIG. 9, one of the competition definition tables 31 for the specified device and the specified device-control instruction is read out by the number-A and the number-B of the logical device identifier (LDI) in the DCR.

In the read-out competition definition table 31, a set of competition priority levels for the respective devices of the above group is defined. One (labeled "R" in FIG. 9) of the competition priority levels for the specified device is read out by using the number-A and the number-B of the LDI. In the present embodiment, the read-out competition priority level (R) consists of 2 bits which represent one of four different competition priority levels: no competition (R=0), competition priority level 1 (R=1), competition priority level 2 (R=2), and competition priority level 3 (R=3).

Any of individual competition states between the devices and any of individual competition priority levels, defined in the set of competition definition tables 31, can be modified by inputting a modification command.

Figure 10A:
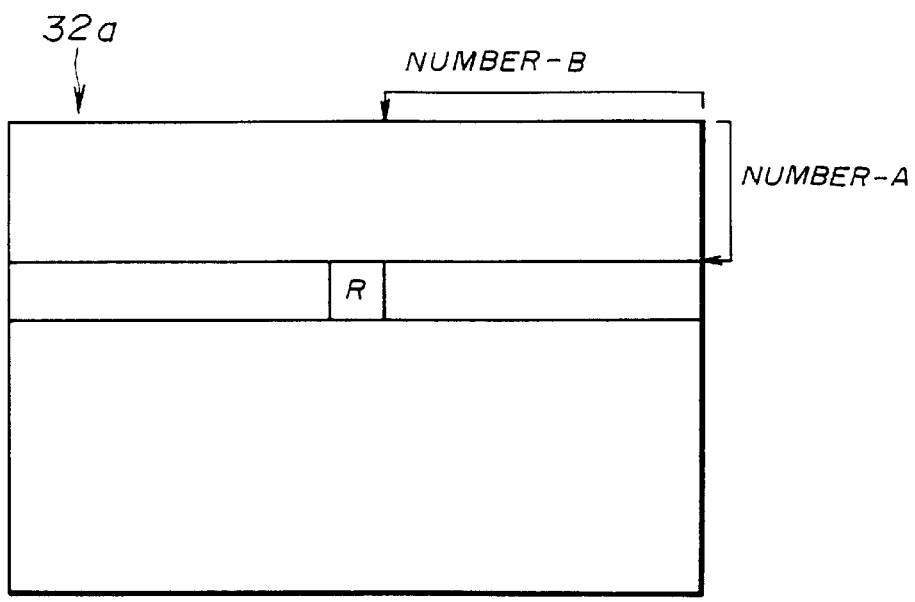
FIGS. 10A and 10B are diagrams showing a competition state table used by the competition control unit in FIG. 1.
Figure 10B:
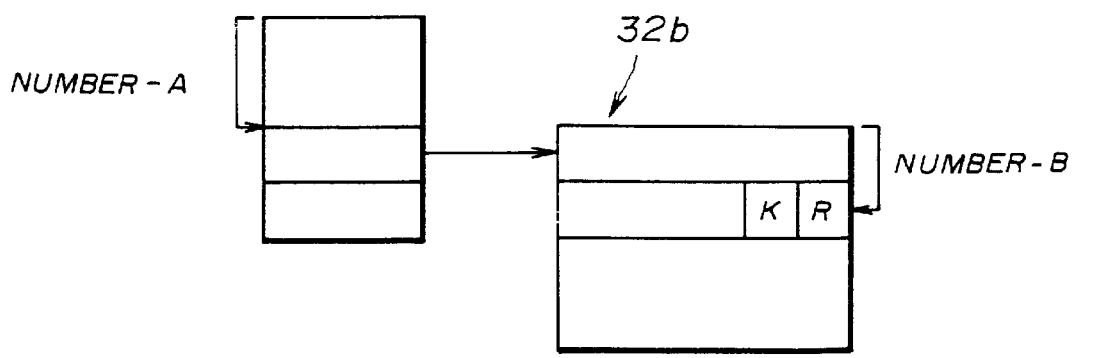

FIG. 10A shows a competition state summary 32a of the competition state table 32 provided in the competition control unit 15. FIG. 10B shows a competition state detail 32b of the competition state table 32. A competition priority level of a competition device is defined in the competition state table 32 if an instruction to the competition device is in process. The competition state table 32 contains the competition state summary 32a and the competition state detail 32b. By comparing the competition definition table 31 and the competition state table 32, it is determined whether there is a competition state between the competition device and the specified device.

When it is detected that there is a competition state between the devices, the priority determining unit 17 determines a competition priority level of the competition device and a post-processing program number, which will be described later.

As shown in FIG. 10A, a way of reading out the competition state summary 32a is the same as the way of reading out the competition definition table 31 in FIG. 9. However, individual competition states of the competition state summary 32a are updated by rewriting previous data each time one device-control instruction to one device of the digital switching system is executed.

In the competition state summary 32a, a set of competition priority levels for respective devices of a group related to the competition device is defined. One (labeled "R" in FIG. 10A) of the competition priority levels for the competition device is read out by using the number-A and the number-B of the logical device identifier (LDI) in the DCR. In the present embodiment, the competition priority level (R) of the competition device consists of 2 bits which represent one of four different competition priority levels: no competition (R=0), competition priority level 1 (R=1), competition priority level 2 (R=2), and competition priority level 3 (R=3). This is the same as the competition priority level R of the specified device shown in FIG. 9.

As shown in FIG. 10B, an in-process device-control instruction code "K" of the competition device and a competition priority level "R" of the competition device in the competition state detail 32b are defined. These are read out by using the number-A and the number-B of the logical device identifier (LDI) in the DCR. The in-process device-control instruction code (K) indicates one of the device-control instructions shown in FIG. 7. By using the in-process device-control instruction code (K), the competition control unit 15 determines a post-processing step number.

FIG. 11 shows an example of operating states of all the devices of the digital switching system in FIG. 3. In FIG. 11, "OUS" indicates that the device is in an isolated state, that is, the device is isolated from the digital switching system.

Figure 12A:
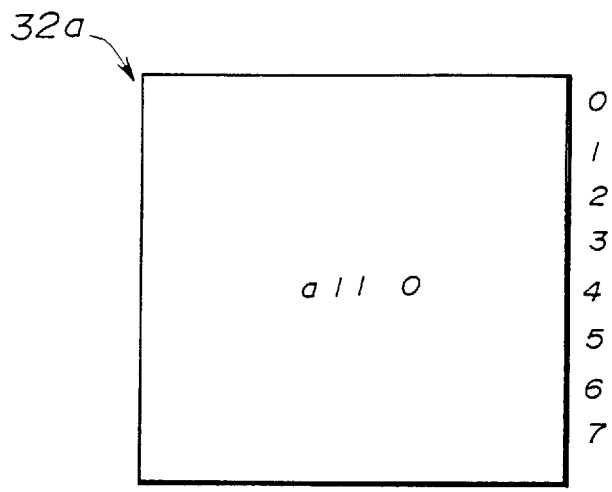
FIG. 12A is a diagram showing the contents of a competition state summary when the devices of the digital switching system are in the operating states in FIG. 11.
Figure 12B:
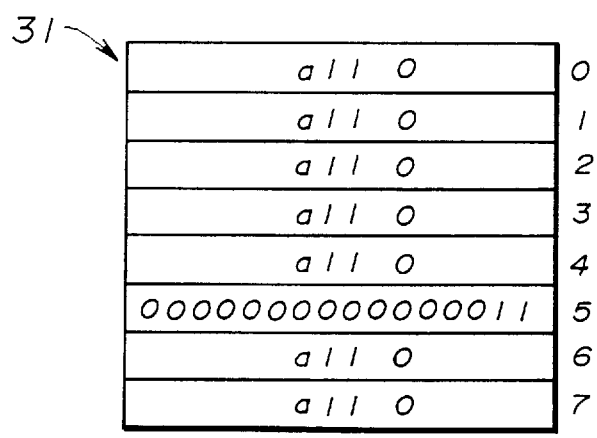
FIGS. 12B and 12C are diagrams showing the contents of competition definition tables for two devices when an instruction is made to each of the two devices.
Figure 12C:
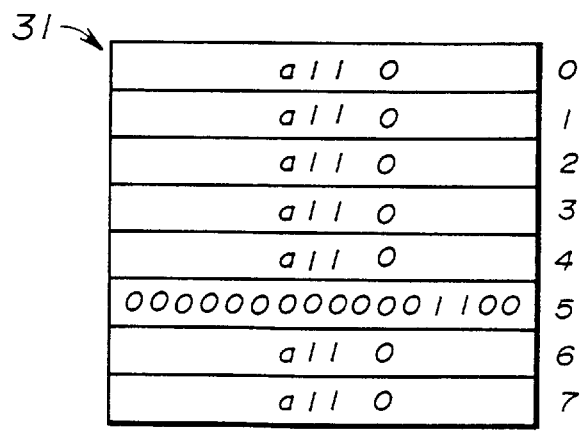

FIG. 12A shows the contents of a competition state summary 32a when the devices of the digital switching system are in the operating states in FIG. 11. FIGS. 12B and 12C show the contents of competition definition tables 31 for two devices when a device-control instruction is made to each of the two devices. FIGS. 13A and 13B show the contents of competition definition tables 31 for two other devices when the device-control instruction is made to each of those devices.

For the purpose of explaining the competition control unit 15 of the present invention, a typical case is taken into consideration. When all the devices of the digital switching system are in the operating states in FIG. 11 and the contents of the competition state summary 32a are all zeros as in FIG. 12A, an AUTOMATIC PLACING IN SERVICE instruction is made to control each of the devices DK#1, DK#3, WS#1 and MO#1.

These four devices are arranged in the digital switching system under the channel 25n (CHC#1). As a result of the AUTOMATIC PLACING IN SERVICE instruction to these devices, the contents of the competition definition tables 31 for these devices are set as shown in FIGS. 12B, 12C, 13A and 13B. When the AUTOMATIC PLACING IN SERVICE instruction is made, the operating states of the four devices are changed from the OUS state to any of the ACT, MASTER and SLAVE operating states. In the digital switching system, the AUTOMATIC PLACING IN SERVICE instruction to the devices arranged under the channel CHC#1 is automatically performed when the channel CHC#1 is changed to the ACT operating state.

Referring to FIG. 12B, the AUTOMATIC PLACING IN SERVICE instruction is made to the device DK#1. The number-A of the logical device identifier (LDI) of the device DK#1 is 5, and the number-B of the LDI of the device DK#1 is 1, as shown in FIG. 5. The competition priority level R of this device is defined at a corresponding location of the competition definition table 31. As shown in FIG. 12B, the competition priority level R of the device DK#1 is set at one "1". Similarly, the competition priority level R of another device DK#0 (the number-A=5, the number-B=0) is set at one "1". According to the competition definition table 31 in FIG. 12B, it is found that there is a competitive relation between the device DK#1 and the device DK#0. In this case, the device DK#1 is the specified device, and the device DK#0 is the competition device.

Referring to FIG. 12C, the AUTOMATIC PLACING IN SERVICE instruction is made to the device DK#3. The number-A of the LDI of the device DK#3 is 5, and the number-B of the LDI of the device DK#3 is 3, as shown in FIG. 5. The competition priority level R of this device is defined at a corresponding location of the competition definition table 31. As shown in FIG. 12C, the competition priority level R of the device DK#3 is set at one "1". Similarly, the competition priority level R of another device DK#2 (the number-A=5, the number-B=2) is set at one "1". According to the competition definition table 31 in FIG. 12C, it is found that there is a competitive relation between the device DK#3 and the device DK#2. In this case, the device DK#3 is the specified device, and the device DK#2 is the competition device.

Referring to FIG. 13A, the AUTOMATIC PLACING IN SERVICE instruction is made to the device WS#1. The number-A of the LDI of the device WS#1 is 6, and the number-B of the LDI of the device WS#1 is 1, as shown in FIG. 5. The competition priority level R of this device is defined at a corresponding location of the competition definition table 31. As shown in FIG. 13A, the competition priority level R of the device WS#1 is set at one "1". The competition priority levels R of other devices are set at zeros "0". According to the competition definition table 31 in FIG. 13A, it is found that there is no competitive relation between the device WS#1 and the other devices of the same kind.

Referring to FIG. 13B, the AUTOMATIC PLACING IN SERVICE instruction is made to the device MO#1. The number-A of the LDI of the device MO#1 is 7, and the number-B of the LDI of the device MO#1 is 1, as shown in FIG. 5. The competition priority level R of this device is defined at a corresponding location of the competition definition table 31. As shown in FIG. 13B, the competition priority level R of the device MO#1 is set at one "1". The competition priority levels R of other devices are set at zeros "0". According to the competition definition table 31 in FIG. 13B, it is found that there is no competitive relation between the device MO#1 and the other devices of the same kind.

According to the competition definition tables 31 in FIGS. 12B and 12C, the competitive relation between the devices DK#1 and DK#0 and the competitive relation between the devices DK#3 and DK#2 are found. However, according to the competition state table 32a in FIG. 12A, both the competition priority level R of the device DK#0 and the competition priority level R of the device DK#2 are set at zeros. Therefore, the competition control unit 15 detects, in the present case, that there is no competition state between the devices DK#1 and DK#0 and there is no competition state between the devices DK#3 and DK#2.

Accordingly, in the above case in which the AUTOMATIC PLACING IN SERVICE instruction is made to control each of the devices DK#1, DK#3, WS#1 and MO#1, the competition control unit 15 detects that there is no competition state between the devices, by comparing each read-out competition definition table 31 with the competition state table 32.

Figure 14:
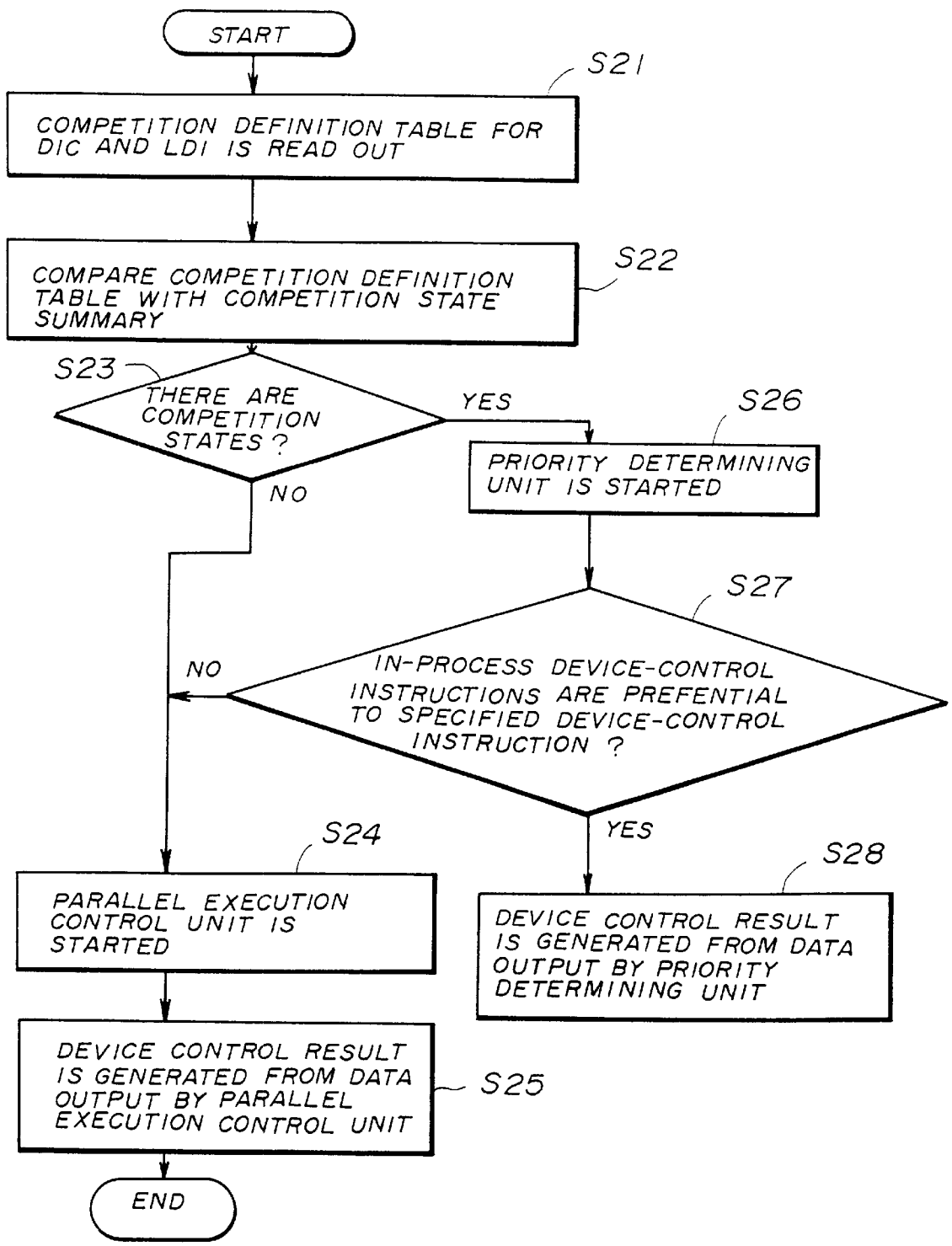
FIG. 14 is a flowchart for explaining an operation of the competition control unit in FIG. 1.

FIG. 14 shows an operation of the competition control unit 15 in FIG. 1. The competition control unit 15 receives the device control request (DCR) from the request accepting unit 14, and generates a device control result from data output from the parallel execution control unit 16. As described above, the data output from the competition control unit 15 is transmitted to the request accepting unit 14 as the device control event (DCE).

Referring to FIG. 14, the competition control unit 15, at step S21, reads out one of the competition definition tables 31 by the specified device-control instruction code (DIC) and the specified logical device identifier (LDI) in the DCR when the DCR from the request accepting unit 14 is received.

The competition control unit 15, at step S22, compares the read-out competition definition table 31 with the competition state table 32. Step S23 detects whether there are competition states between in-process device-control instructions to the competition devices and the specified device-control instruction to the specified device.

When it is detected at the step S23 that there is no competition state, step S24 starts the parallel execution control unit 16. Step S25 generates a device control result from data output by the parallel execution control unit 16. The device control request generated by the competition control unit 15 is transmitted to the request accepting unit 14 as the device control event (DCE). After this, the operation of the competition control unit 15 ends.

When it is detected at the step S23 that there are the competition states, the competition control unit 15, at step S26, starts the priority determining unit 17.

Step S27 detects whether the in-process device-control instructions, currently being executed, are preferential to the specified device-control instruction in the DCR. Actually, this step is performed by the priority determining unit 17, not by the competition control unit 15. The competition control unit 15 merely receives a determination made by the priority determining unit 17.

When the result at the step S27 is negative (the specified device-control instruction is preferential), the above step S24 is performed to start the parallel execution control unit 16. On the other hand, when the result at the step S27 is affirmative (the in-process device-control instructions are preferential), step S28 generates a device control result from data output by the priority determining unit 17, the output data indicating a determination on whether the in-process device-control instructions are preferential to the specified device-control instruction. The device control result output by the competition control unit 15 is transmitted to the request accepting unit 14 as the device control event (DCE).

Accordingly, the competition control unit 15 recognizes the competition states between the in-process device-control instructions to the competition devices and the specified device-control instruction to the specified device by comparing the read-out competition definition table 31 with the competition state table 32. The competition priority levels (R) of the competition devices are read out from the competition state summary 32a. Each in-process device-control instruction code (K) of the in-process device-control instructions is read out from the competition state detail 32b.

Figure 15:
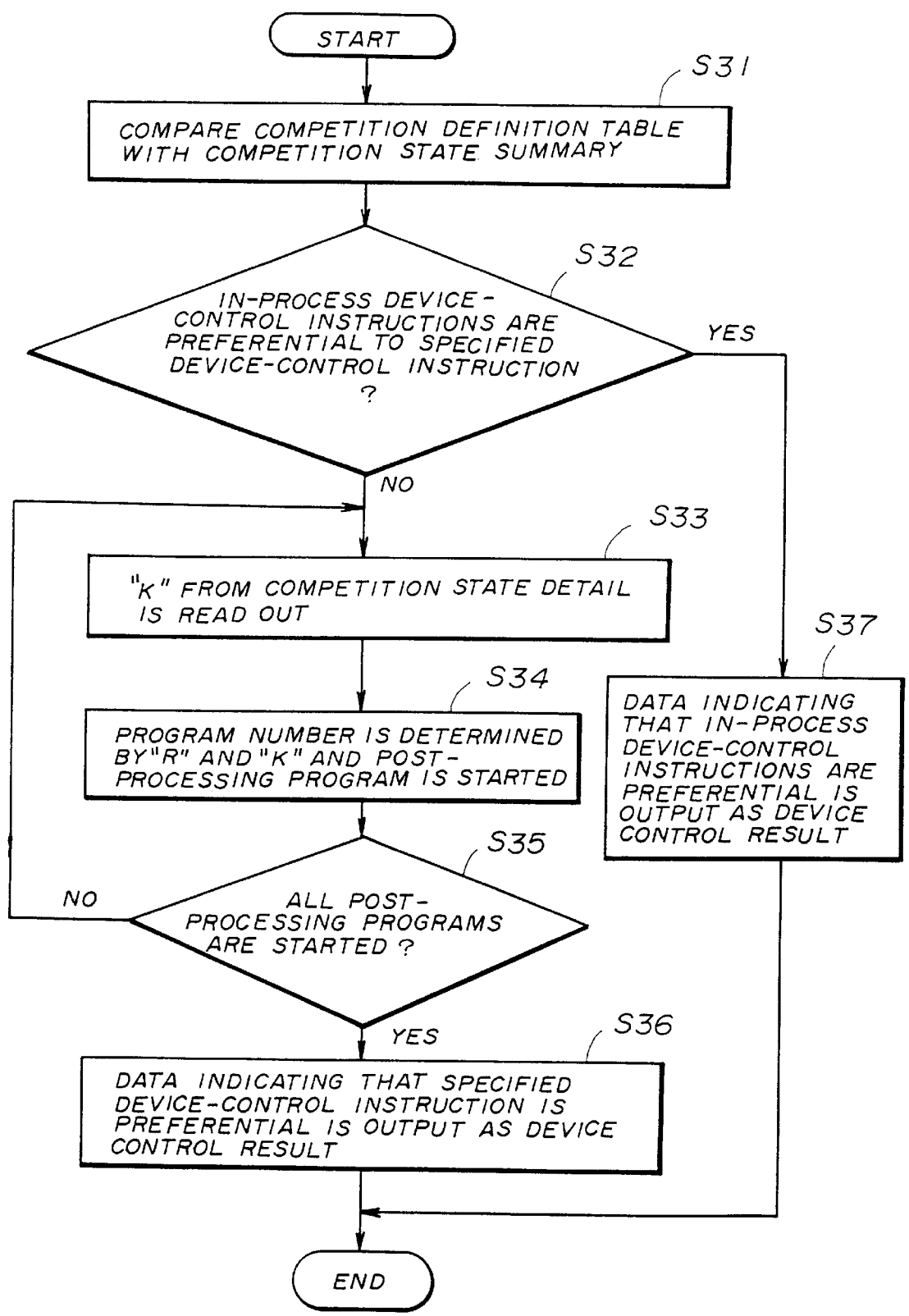
FIG. 15 is a flowchart for explaining an operation of a priority determining unit in FIG. 1.

FIG. 15 shows an operation of the priority determining unit 17 in FIG. 1. The priority determining unit 17 receives the device control request (DCR) with the specified device-control instruction, the read-out competition definition table 31, and the competition state table 32 from the competition control unit 15, and makes a determination on whether the in-process device-control instructions are preferential to the specified device-control instruction. As described above, the data output by the priority determining unit 17 as a result of the determination is transmitted to the competition control unit 15 as the device control event (DCE).

Referring to FIG. 15, the priority determining unit 17, at step S31, compares the readout competition definition table 31 with the competition state table 32. As described above, when the result at the step S23 in FIG. 14 is affirmative, the read-out competition definition table 32 and the competition state table 32 are supplied by the competition control unit 15 to the priority determining unit 17.

The priority determining unit 17, at step S32, detects whether the in-process device-control instructions to the competition devices are preferential to the specified device-control instruction to the specified device, based on the competition priority level R (FIG. 9) of the read-out competition definition table 31 for the specified device and the competition priority levels R (FIG. 10A) of the competition state table 32 for the competition devices.

More specifically, when the R for one competition device is greater than the R for the specified device, it is determined at the step S32 that the in-process device-control instruction is preferential. When the R for all the competition devices are not greater than the R for the specified device, it is determined at the step S32 that the specified device-control instruction is preferential.

When the result at the step S32 is negative (the specified device-control instruction is preferential), step S33 reads out the respective in-process device-control instruction codes K from the competition state detail 32b (FIG. 10B). Step S34 determines a post-processing program number by the competition priority level R for the specified device and the in-process device-control instruction codes K for the competition device, and starts a post-processing program indicated by the program number. This will be described later.

After the step S34 is performed, step S35 detects whether all post-processing programs for all the competition devices (that compete with the specified device-control instruction to the specified device) have been started. When the result at the step S35 is negative, performing the steps S33 through S35 is repeated.

After all the post-processing programs for all the competition devices have been started, step S36 outputs data indicating that the specified device-control instruction is preferential to the in-process device-control instructions. The data output by the priority determining unit 17 is transmitted to the competition control unit 15 as the device control result. After the step S36 is performed, the operation of the priority determining unit 17 ends.

On the other hand, when the result at the step S32 is affirmative (the in-process device-control instructions are preferential), step S37 outputs data indicating that the in-process device-control instructions are preferential to the specified device-control instruction. The data output by the priority determining unit 17 is transmitted to the competition control unit 15 as the device control event. After the step S37 is performed, the operation of the priority determining unit 17 ends.

Figure 16:
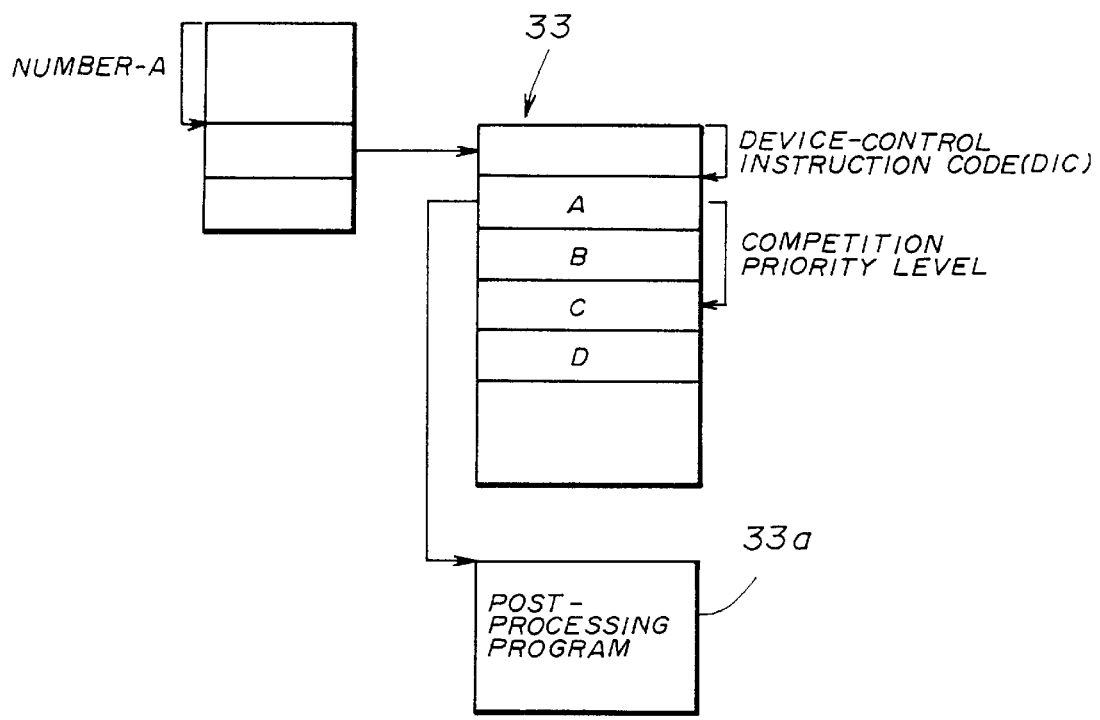
FIG. 16 is a diagram showing a post-processing program starting table.

FIG. 16 shows a post-processing program starting table 33 read out by the priority determining unit 17.

In the present embodiment, a set of post-processing program starting tables 33 for respective combinations of the logical device identifier (LDI) of each device (as shown in FIG. 5) and the device-control instruction code (DIC) of each device-control instruction (as shown in FIG. 7) are stored in the priority determining unit 17. One of the post-processing starting tables 33 is read out by the priority determining unit 17 in accordance with the device control request (DCR) as shown in FIG. 16.

A way of reading out the post-processing program starting table 33 by the priority determining unit 17 is similar to the way of reading out the competition definition table 31 by the competition control unit 15.

Further, in the present embodiment, a set of post-processing programs 33a is stored in the main storage units 22n of the digital switching system in FIG. 3. The priority determining unit 17 comprises a post-processing unit which contains these post-processing program number tables 33 and these post-processing programs 33a. The post-processing unit determines a program number by the competition priority level of the read-out competition definition table when it is detected that the specified device-control instruction is preferential, and starts a post-processing program read out by the program number. This operation of the post-processing unit will be described below.

As shown in FIG. 16, the read-out post-processing program starting table 33 contains a set of program numbers for respective competition priority levels. In the present embodiment, the read-out post-processing program starting table 33 contains four program numbers "A" through "D" as shown in FIG. 16. The program number A indicates a post-processing program started when a parallel-execution weight exceeds a maximum weight. The program number B indicates a post-processing program started when the competition priority level R for the specified device is equal to 1 (the lowest priority level). The program number C indicates a post-processing program started when the competition priority level R for the specified device is equal to 2 (the middle priority level). The program number D indicates a post-processing program started when the competition priority level R for the specified device is equal to 3 (the highest priority level).

For example, when the competition priority level R for the specified device is equal to 2, the program number C is read out from the post-processing program starting table 33 as shown in FIG. 16, and the post-processing program 33a indicated by the program number C is started by the priority determining unit 17.

Each of the post-processing programs performs a communication between a corresponding competition device and the specified device (e.g., a task-to-task communication or a process-to-process communication) after it is started by the priority determining unit 17, and cancels or delays the execution of the in-process device-control instruction to the competition device.

Figure 18A:
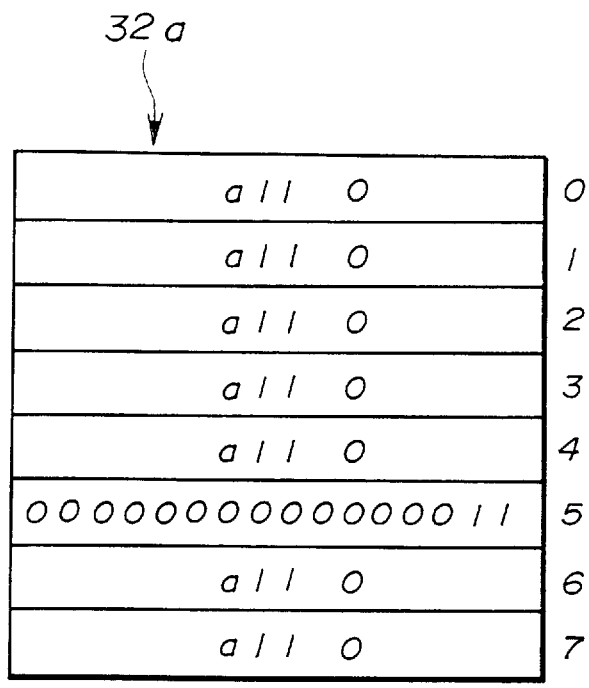
FIG. 18A is a diagram showing the contents of the competition state summary.
Figure 18B:
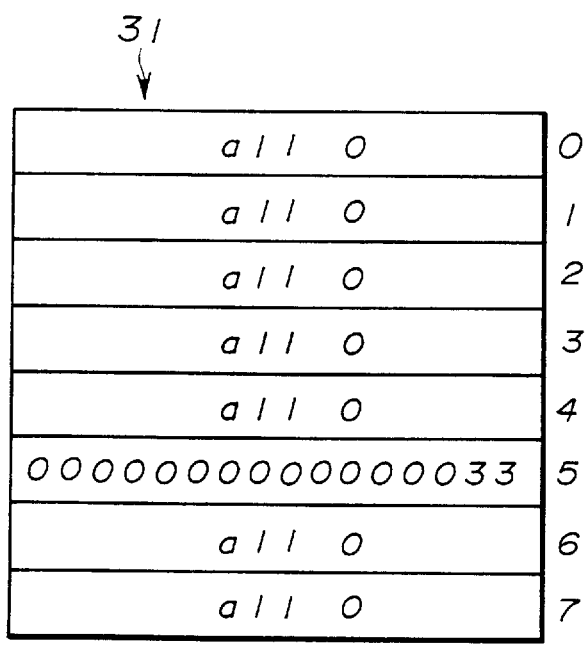
FIG. 18B is a diagram showing the contents of the competition definition table.

FIG. 17 shows an example of operating states of all the devices of the digital switching system in FIG. 3. In FIG. 17, a PLACING IN SERVICE BY COMMAND instruction is made to the device DK#1, and the operating state of the device DK#1 is changed from the OUS state into the SLAVE state. FIG. 18A shows the contents of the competition state summary 32a. FIG. 18B shows the contents of the competition definition table 31 when the devices of the system are in the operating states in FIG. 17, the contents of the competition state summary 32a are as in FIG. 18A, and an ISOLATING BY FAILURE instruction has made to the device DK#1.

For the purpose of explaining the priority determining unit 17 of the present invention, an example of the operation of the priority determining unit 17 will be taken into consideration, with reference to FIGS. 17, 18A and 18B.

In this example, it is supposed that when all the devices of the digital switching system are in the operating states in FIG. 17 and the contents of the competition state summary 32a are as shown in FIG. 18A, a failure of the device CHC#1 has occurred. Since an ISOLATING BY FAILURE instruction is made to the device CHC#1, an ISOLATING BY FAILURE instruction is subsequently made to the device DK#1 arranged under the device CHC#1. The contents of the competition definition table 31 when this ISOLATING BY FAILURE instruction has made to the device DK#1 are as shown in FIG. 18B. It is detected at this time that there is a competition state between the ISOLATING BY FAILURE instruction newly made to the device DK#1 (the specified device) and the PLACING IN SERVICE BY COMMAND instruction previously made to the device DK#1 (the competition device).

In the above example, the priority determining unit 17 compares the competition definition table 31 in FIG. 18B and the competition state summary 32a in FIG. 18A. Since the competition priority level R of the competition state summary 32a for the device DK#1 (the competition device) is set at 1 and the competition priority level R of the competition definition table 31 for the device DK#1 (the specified device) is set at 3, the priority determining unit 17 detects that the ISOLATING BY FAILURE instruction (the specified device-control instruction) is preferential to the PLACING IN SERVICE BY COMMAND instruction (the in-process device-control instruction).

Therefore, the ISOLATING BY FAILURE instruction to the device DK#1 which is preferential is executed, and the execution of the PLACING IN SERVICE BY COMMAND instruction to the device DK#1 is to be canceled.

Since the competition priority level R for the specified device in the above example is equal to 3, the program number D is read out from the post-processing program starting table 33, and the post-processing program 33a indicated by the program number D is started by the priority determining unit 17.

Figure 19:
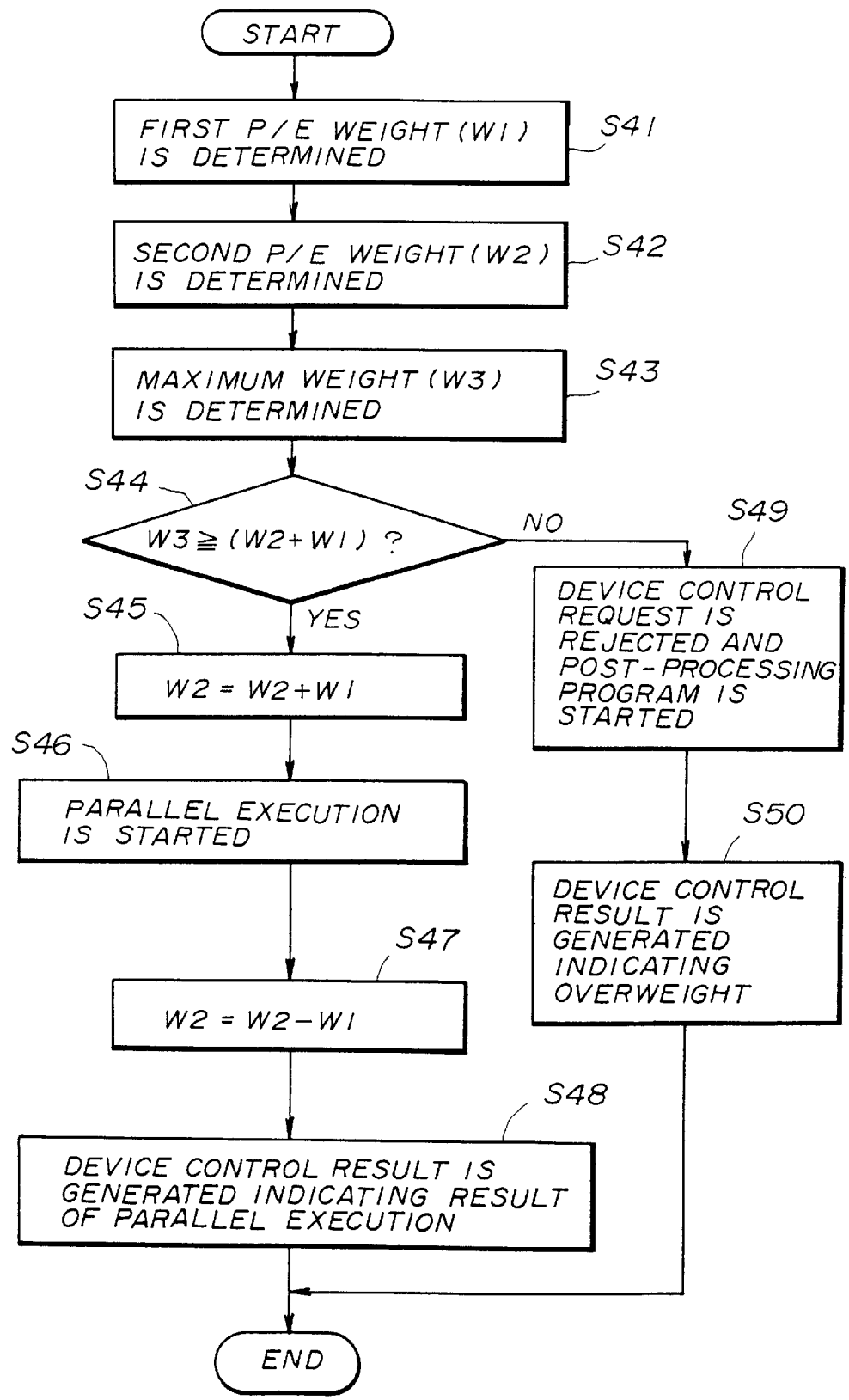
FIG. 19 is a flowchart for explaining an operation of a parallel-execution control unit in FIG. 1.

FIG. 19 shows an operation of the parallel execution control unit 16 in FIG. 1. The parallel execution control unit 16 receives the device control request (DCR) containing the specified device-control instruction from the competition control unit 15, and generates a device control result as the output data.

In the parallel execution control unit 16, parallel-execution (P/E) weights for the respective device-control instructions to the devices of the digital switching system are defined in the set of competition definition tables 31. Each of the P/E weights indicates a ratio of the used resources to all the resources of the digital switching system. The individual P/E weights defined in the set of competition definition tables 31 can be modified by inputting a modification command.

Referring to FIG. 19, when the device control request (DCR) is received, the parallel execution control unit 16, at step S41, determines a first P/E weight (W1) for the specified device-control instruction by the logical device identifier (LDI) and the device-control instruction code (DIC) in the DCR.

Step S42 determines a second P/W weight (W2) for the in-process device-control instructions to the competition devices.

Step S43 determines a maximum P/E weight (W3) by a system load level. The system load level indicates the current load of the digital switching system.

Based on the weights W1, W2 and W3, the parallel execution control unit 16, at step S44, detects whether the maximum P/E weight W3 is greater than or equal to the sum of the first P/E weight W1 and the second P/E weight W2 (or W3≧(W2+W1) ?).

When the result at the step S44 is affirmative (W3 is above the sum of W1 and W2), step S45 replaces the second P/E weight W2 by the sum of the first P/E weight W1 and the second P/E weight W2 (W2=W2+W1).

After the step S45 is performed, step S46 starts the parallel execution of the in-process device-control instructions to the competition devices and the specified device-control instruction to the specified device. At this step, the parallel execution control unit 16 receives the device-control instruction code (DIC) and the logical device identifier (LDI) of each device through the competition control unit 15. After the execution of the specified device-control instruction is started, the parallel execution control unit 16 outputs the device control result to the competition control unit 15.

After the step S46 is performed, step S47 subtracts the first P/E weight W1 (for the executed device-control instruction) from the above second P/E weight W2 (for the in-process device-control instructions) (W2=W2−W1).

After the step S47 is performed, step S48 generates a device control result, this output data indicating the result of the parallel execution. The data output by the parallel execution control unit 16 is transmitted to the competition control unit 15 as the device control event. After the step S48 is performed, the operation of the parallel execution control unit 16 ends.

On the other hand, when the result at the step S44 is negative (W3 is below the sum of W1 and W2), step S49 rejects the device control request (DCR) and starts the post-processing program 33a in FIG. 16.

After the step S49 is performed, step S50 generates a device control result, this output data indicating that the maximum P/E weight (W3) will be exceeded if the specified device-control instruction is performed. The date output by the parallel execution control unit 16 is transmitted to the competition control unit 15 as the device control event. After the step S50 is performed, the operation of the parallel execution control unit 16 ends.

FIG. 20A, 20B, and 20C are a way of determining the first P/E weight (W1), the second P/E weight (W2) and the maximum P/E weight (W3).

As indicated by (A) in FIG. 20, the first P/E weight (W1) for the specified device-control instruction is read out from the read-out competition definition table 31 by the logical device identifier (LDI) and the device-control instruction code (DIC) in the device control request (DCR).

As indicated by (B) in FIG. 20, the maximum P/E weight (W3) is determined by a system load level. The system load level indicates the current load of the digital switching system. The greater the current load is, the greater the value of the system load level is. For example, when the system load level is equal to 2, a corresponding value of the maximum P/E weight is read out by the system load level.

The individual P/E weights for the respective device control instructions are defined in the set of competition definition tables 31, and the individual P/E weights and the maximum P/E weight can be modified by inputting a modification command.

As indicated by (C) in FIG. 20, the second P/W weight (W2) for the in-process device-control instructions to the competition devices is determined.

FIG. 21 shows an example of the operation of the parallel execution control unit 16.

In the present example, it is supposed that all the devices of the digital switching system in FIG. 3 are in the operating states shown in FIG. 11, the competition state summary 32a is as shown in FIG. 12A, and the system load level is equal to 2.

As shown in FIG. 21, the second P/E weight (W2) for the in-process device-control instructions is initially determined as being zero. The maximum P/E weight (W3) is determined by the system load level (=2) as being 4. A set of different maximum P/E weights are defined as shown in FIG. 21, and one of the different maximum P/E weights is read out by the system load level.

In the above example, an AUTOMATIC PLACING IN SERVICE instruction is sequentially made to the device WS#1, the device MO#1, the device DK#1, and the device DK#3 in this order. These devices are arranged in the digital switching system under the device CHC#1.

As shown in FIG. 21, the first P/E weight (W1) for the device WS#1 when the above instruction is made to this device is determined as being 1. The first P/E weight (W1) for the device MO#1 when the above instruction is further made to this device is determined as being 1. The first P/E weight (W1) for the device DK#1 when the above instruction is further made to this device is determined as being 2.

The first P/E weight (W1) for the device DK#3 when the above instruction is further made to this device is determined as being 2. The second P/E weight (W2) for the in-process device-control instructions to the devices WS#1, MO#1 and DK#1 at this time is determined as being 4. As shown in FIGS. 12B, 12C, 13A and 13B, there is no competition state when the AUTOMATIC PLACING IN SERVICE instructions to the four devices WSi#1, MO#1, DK#1 and DK#3 are performed in parallel.

When the above instruction to the device DK#3 is finally performed, it is detected that the sum of the first P/E weight W1 (=2) and the second P/E weight W2 (=4) exceeds the maximum P/E weight W3 (=4). Therefore, the parallel execution control unit 16 rejects the device control request for the instruction to the device DK#3, and a post-processing program corresponding to the device DK#3 is started.

In the above-described embodiment, the set of competition definition tables 31 and the competition state table 32 are provided in the competition control unit 15. However, according to the present invention, it is possible to modify the above embodiment such that the set of competition definition tables 31 and the competition state table 32 are stored in the main storage units 22n (MM) in FIG. 3.

In the above-described embodiment, the device control apparatus 12 is provided in the main storage units 22n (MM)

in FIG. 3. However, according to the present invention, it is possible to modify the above embodiment such that the device control apparatus 12 is provided in the central processing units 21n (CC) in FIG. 3. Alternatively, it is possible to provide the device control apparatus 12 in another suitable device which is separate from all the devices of the digital switching system.

Further, the present invention is not limited to the above-described embodiment, and variations and modifications may be made without departing from the scope of the present invention.

What is claimed is:

1. A device control apparatus for controlling execution of one or a plurality of device-control instructions to a plurality of devices of a system, comprising:

a request accepting unit accepting a device control request, said device control request containing an instruction code indicating a specified instruction and a device identifier indicating a specified device;

a competition control unit including a set of competition definition tables for the respective devices and the respective device-control instructions, reading out one of the competition definition tables by said device control request, and recognizing competition states between in-process instructions to competition devices and the specified instruction to the specified device by using the readout competition definition table; and a parallel execution control unit performing execution of one or a plurality of the specified instruction and the in-process instructions in accordance with said competition states when a sum of a first weight for the specified instruction and a second weight for the in-process instructions is less than a maximum weight.

2. The apparatus according to claim 1, further comprising:

a priority determining unit detecting whether the in-process instructions are preferential to the specified instruction by comparing a priority level of the read-out competition definition table with priority levels of a competition state table.

3. The apparatus according to claim 2, wherein individual priority levels defined in said set of competition definition tables are capable of being modified.

4. The apparatus according to claim 2, wherein said priority determining unit comprises:

a post-processing unit determining a program number by the priority level of the read-out competition definition table when it is detected that the specified instruction is preferential, and starting a post-processing program read out by said program number.

5. The apparatus according to claim 1, wherein individual priority levels defined in said set of competition definition tables are capable of being modified.

6. The apparatus according to claim 1, wherein said parallel execution control unit determines the first weight by the device identifier and the instruction code in the device control request, determines the second weight for the in-process instructions, and determines the maximum weight by a system load level.

7. The apparatus according to claim 6, wherein individual weights for the respective device control instructions are defined in the set of competition definition tables, and the individual weights and the maximum weight are capable of being modified.

8. The apparatus according to claim 6, wherein said parallel execution control unit starts a post-processing program when the sum of the first weight and the second weight is above the maximum weight, said post-processing program being read out by a priority level for the specified instruction.

9. A device control method of controlling execution of one or a plurality of device-control instructions to a plurality of devices of a system, wherein a competition control unit includes a set of competition definition tables for the respective devices and the respective device-control instructions, comprising the steps of:

accepting a device control request, said device control request containing an instruction code indicating a specified instruction and a device identifier indicating a specified device;

reading out one of the competition definition tables by said device control request, and recognizing competition states between in-process instructions to competition devices and the specified instruction to the specified device by using the readout competition definition table; and performing execution of one or a plurality of the specified instruction and the in-process instructions in accordance with said competition states when a sum of a first weight for the specified instruction and a second weight for the in-process instructions is less than a maximum weight.

10. The method according to claim 9, further comprising a step of:

detecting whether the in-process instructions are preferential to the specified instruction by comparing a priority level of the readout competition definition table with priority levels of a competition state table.

11. The method according to claim 10, wherein said reading out and recognizing step further includes:

starting said performing step when no competition state is recognized, and starting said detecting step when the competition states are recognized.

12. The method according to claim 10, wherein said detecting step further includes:

determining a program number by the priority level of the read-out competition definition table when it is detected that the specified instruction is preferential; and starting a post-processing program read out by said program number.

13. The method according to claim 9, wherein said accepting step further includes:

starting an operation of the competition control unit in accordance with the device control request; and transmitting data output by the competition control unit to a request source after the competition control unit is started.

14. The method according to claim 9, wherein said performing step further includes:

determining the first weight by the device identifier and the instruction code in the device control request;

determining the second weight for the in-process instructions; and determining the maximum weight by a system load level.

15. The method according to claim 14, wherein said performing step further includes:

starting a post-processing program when the sum of the first weight and the second weight is above the maximum weight, said post-processing program being read out by a priority level for the specified instruction.

* * * * *